United States Patent
Shalom et al.

(10) Patent No.: US 12,238,179 B2
(45) Date of Patent: Feb. 25, 2025

(54) SYSTEMS AND METHODS OF MESSAGE-BASED PACKETS

(71) Applicant: MELLANOX TECHNOLOGIES, LTD., Yokneam (IL)

(72) Inventors: Gal Shalom, Givat-Avni (IL); Omri Kahalon, Tel Aviv (IL); Adi Horowitz, Tel-Aviv (IL); Aviad Shaul Yehezkel, Yokneam Ilit (IL); Eliav Bar-Ilan, Or Akiva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/143,411

(22) Filed: May 4, 2023

(65) Prior Publication Data

US 2024/0372923 A1  Nov. 7, 2024

(51) Int. Cl.
*H04L 67/141* (2022.01)
*H04L 67/02* (2022.01)
*H04L 69/16* (2022.01)
*H04L 69/22* (2022.01)

(52) U.S. Cl.
CPC ............ *H04L 67/141* (2013.01); *H04L 67/02* (2013.01); *H04L 69/16* (2013.01); *H04L 69/22* (2013.01)

(58) Field of Classification Search
CPC ....... H04L 67/141; H04L 67/02; H04L 69/16; H04L 69/22
USPC .......................................................... 709/227
See application file for complete search history.

(56) References Cited

U.S. PATENT DOCUMENTS

| | | | | |
|---|---|---|---|---|
| 5,101,402 A | * | 3/1992 | Chiu | H04L 43/00 709/224 |
| 6,965,941 B2 | * | 11/2005 | Boucher | H04Q 3/0029 709/230 |
| 7,293,100 B2 | * | 11/2007 | Jayam | H04L 67/06 709/200 |
| 7,603,408 B1 | * | 10/2009 | McGinnis | H04W 12/03 709/245 |
| 2002/0004819 A1 | * | 1/2002 | Agassy | G06F 16/23 707/E17.007 |

(Continued)

FOREIGN PATENT DOCUMENTS

CN  1509025 A  *  6/2004

OTHER PUBLICATIONS

Vinton Cerf et al., "Specification of Internet Transmission Control Program", Dec. 1974, IETF RFC: Network Working Group, https://www.rfc-editor.org/rfc/rfc675 (Year: 1974).*

(Continued)

*Primary Examiner* — Ruolei Zong
(74) *Attorney, Agent, or Firm* — Sheridan Ross P.C.

(57) ABSTRACT

A system for transmitting data is described, among other things. An illustrative system is disclosed to include one or more circuits to perform transmitting message-based data over packets. The circuits are capable of identifying a first message, transmitting a first portion of the first message in a first packet, the first packet including a bit indicating the first packet is message-based, and transmitting an end portion of the first message in a second packet, the second packet including a first bit indicating the second packet is message-based and a second bit indicating the second packet comprises the end portion of the first message.

20 Claims, 7 Drawing Sheets

(56) References Cited

U.S. PATENT DOCUMENTS

| | | | | |
|---|---|---|---|---|
| 2002/0099854 | A1* | 7/2002 | Jorgensen | H04L 9/40 |
| | | | | 370/310 |
| 2003/0009571 | A1* | 1/2003 | Bavadekar | H04L 47/34 |
| | | | | 709/230 |
| 2005/0080945 | A1* | 4/2005 | Carroll | H04L 49/55 |
| | | | | 710/33 |
| 2005/0190756 | A1* | 9/2005 | Mundra | H04L 65/1096 |
| | | | | 370/389 |
| 2006/0239263 | A1* | 10/2006 | Torronen | H04L 65/1104 |
| | | | | 370/389 |
| 2013/0100810 | A1* | 4/2013 | Slothouber | H04L 47/28 |
| | | | | 370/235 |
| 2014/0219276 | A1* | 8/2014 | Jokinen | H04L 47/62 |
| | | | | 370/392 |
| 2016/0150055 | A1* | 5/2016 | Choi | H04L 69/22 |
| | | | | 370/401 |
| 2019/0044994 | A1* | 2/2019 | Sarangam | H04L 63/0485 |

OTHER PUBLICATIONS

K. Sklower et al., "The PPP Multilink Protocol (MP)," 1994, IETF RFC: Network Working Group, www.rfc-editor.org/rfc/rfc1717 (Year : 1994).*

Machine translation of CN 1509025 A (Year: 2004).*

* cited by examiner

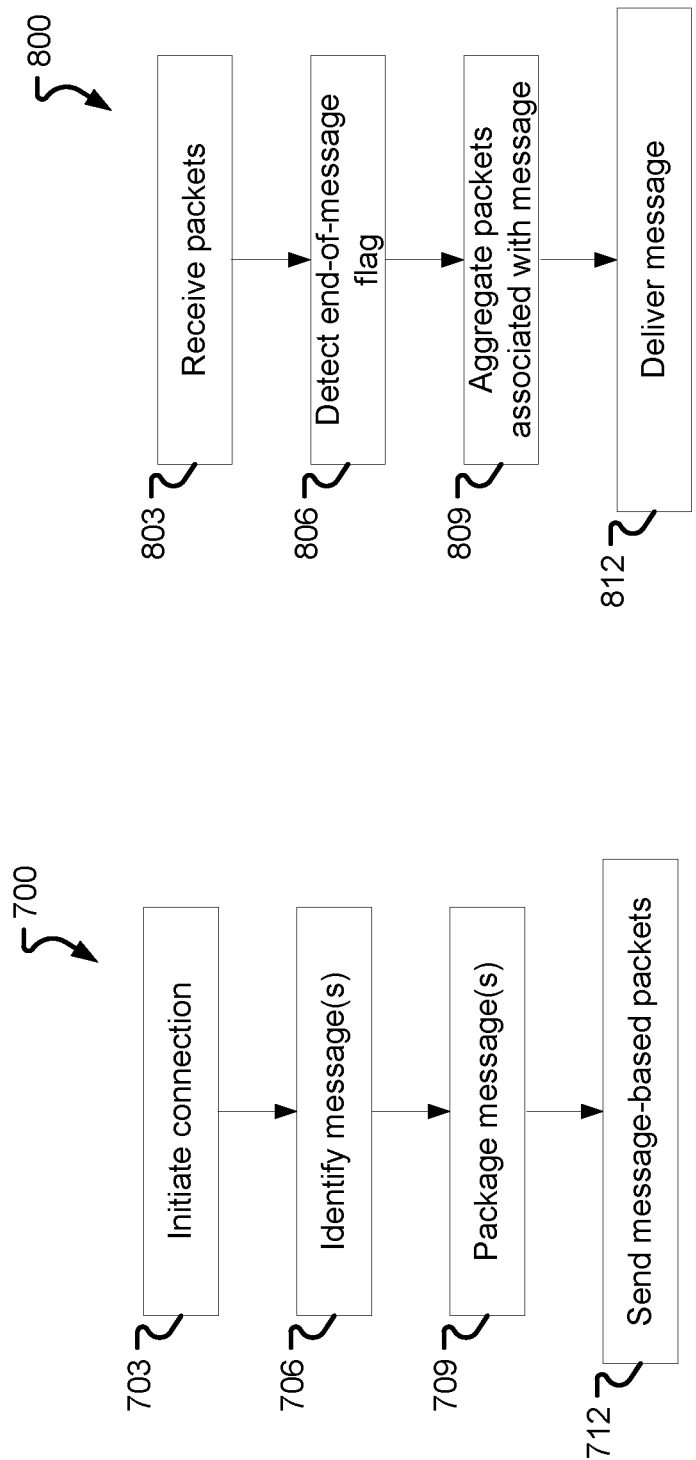

SYSTEMS AND METHODS OF MESSAGE-BASED PACKETS

FIELD OF THE DISCLOSURE

The present disclosure is generally directed to systems, methods, and devices for transmitting data and, in particular, for using packets to transmit messages between nodes.

BACKGROUND

Data centers provide vast processing, storage, and/or networking resources to user devices. Web servers provide web content to user devices. For example, smart phones, Personal Computers (PCs), and Internet of Things (IoT) devices can leverage data centers to perform data analysis, data storage, or data retrieval and can leverage web servers to obtain data from webpages. Data centers, web servers, and user devices are typically connected together by a network using high speed networking devices such as network interfaces, switches, or routers. Devices communicating over a network rely on a combination of stream-based protocols, such as Transmission Control Protocol (TCP), and message-based protocols such as Hypertext Transfer Protocol (HTTP). Conventional methods of enabling communication between devices transmitting packets and devices expecting messages, and between devices transmitting messages and devices expecting packets, create latency issues.

SUMMARY

The disclosed systems and methods enable efficient communication between network-connected devices by enabling a Central Processing Unit (CPU) to process a TCP stream as a message-based communication. The systems and methods described herein remove the need for protocol parsers, which is especially important for a Graphics Processing Unit (GPU) that is processing TCP, where a parser can be inefficient.

As described herein, an option may be added to packets of a stream-based protocol, such as TCP. The option may comprise an option kind number indicating the packet is a message-based packet as described herein. The option may also comprise an option length indicating a total length of the option. The option may further comprise a message identifier (ID) indicating a message to which the packet is related. The option may also include an end-of-message ID indicating whether the packet is a last packet associated with a particular message. The systems and methods described herein may be implemented on one or both of the transmit, or send, side, and the receive side.

On the transmit side, a transmitting application may notify the transport layer about the split of messages into TCP packets. The transport layer may then add an option indicating the TCP packets are message-based. The transport layer may also add a message ID to each of the TCP packets. The message ID may start by labeling packets associated with a first message with a zero message ID and increase the message ID for each message by one. The transport layer may also include an end-of-message ID bit on packets which contain the last part of a particular message.

On the receive side, the transport layer accumulates received packets and transfers the messages the packets compose to the receiving application. The TCP stack may be configured to transfer all packets with a common message ID, ending with a packet which includes a set end-of-message ID, to the receiving application.

In contrast to conventional systems, the new options added to packets as described herein eliminate the need for a parser in the receive side and remove the need for the application protocol to specify how to distinguish between a stream of messages.

Additionally, the described systems and methods enable the transmission of message-based TCP packets even when the sender is unaware. In such an implementation, the receive side may pre-process received TCP packets before delivering them to the TCP stack. The receive pre-process may parse the TCP payload according to an upper layer protocol message and then add a message-based option accordingly before forwarding the TCP payload to the TCP stack.

In some implementations, pre-processing can be offloaded to hardware if the hardware includes a protocol parser\programmable parser. With the receiver-side-only message-based protocol, features of message-based protocols may be achieved without the additional overhead of the message-based option in the write and without the support of the transmit.

Furthermore, as described below, the systems and methods described herein may be used to aggregate TCP packets relating to a message and to treat TCP packets relating to the single message as a single packet.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale:

FIG. 7 is a flowchart of a method in accordance with one or more of the embodiments described herein;

FIG. 8 is a flowchart of a method in accordance with one or more of the embodiments described herein.

DETAILED DESCRIPTION

Figure 1:
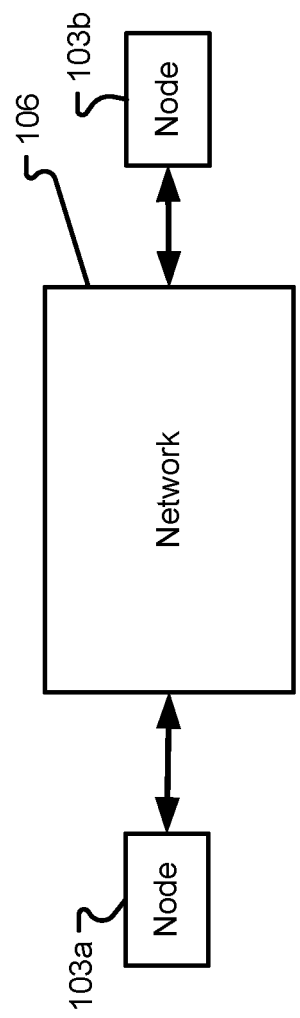
FIG. 1 is a block diagram of a networking environment in accordance with one or more of the embodiments described herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding Summary is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Any of the steps, functions, and operations discussed herein can be performed continuously and automatically.

The systems and methods of this disclosure have been described in relation to a network of switches; however, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases may not necessarily refer to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Two common protocols for transport of data over a network are TCP and the User Datagram Protocol (UDP). TCP is a connection-oriented packet-based protocol that operates at the transport layer. TCP provides a reliable and ordered delivery of a continuous stream of bytes between devices connected to a network.

UDP is a connectionless, unreliable, and message-based protocol. UDP does not establish a connection between the communicating hosts before data transmission. Instead, UDP sends individual messages or datagrams from a sender to a receiver without guaranteeing delivery or ordering of the packets. This lightweight approach enables faster and more efficient data transmission, making UDP suitable for applications where speed is prioritized over reliability, such as streaming media, online gaming, and voice over IP (VOIP) services.

Since UDP is unreliable, data transmitted via UDP is sent in messages, or datagrams, with additional information included in a header/footer.

TCP is one of the main protocols of the Internet protocol suite. TCP is commonly used in everyday environments and highly adopted. TCP is a stream-based protocol, i.e., the payload is considered as a one long flow of bits. However, many protocols which use the TCP transport, such as HTTP, are message-based.

Communication over the Internet relies on various protocols that provide different levels of abstraction and functionality. Among these protocols, TCP and HTTP are essential for enabling reliable, efficient, and secure data transmission.

In a stream-based protocol like TCP, the payload is considered as one long flow of bits. This means that the data being transmitted does not have any inherent structure or boundaries. Instead, the receiving application is responsible for interpreting the incoming stream of data and determining the appropriate boundaries, if necessary. This design choice allows for seamless transmission of large payloads, with the protocol itself ensuring that data is delivered reliably and in the correct order.

HTTP, on the other hand, is a message-based protocol that operates at the application layer. HTTP is primarily used for transmitting and receiving data in the form of structured messages between a client and a server, usually in the context of the World Wide Web. HTTP relies on the underlying TCP protocol to establish a connection and transmit data.

In a message-based protocol like HTTP, the payload is structured into distinct messages, each with its own header and body. The header contains metadata about the message, such as the type of request, the requested resource, and information about the client and server. The body contains the actual content or data being transmitted. This structure allows for easier interpretation and processing of the transmitted data by both the sender and the receiver.

This mismatch between the application protocol and the transport protocol creates a need for mediation between them-a dedicated parser which parses the stream and splits it into different messages-utilizing additional CPU cycles and end-to-end latency. While the stream-based nature of TCP allows for seamless transmission of large payloads, it also necessitates the use of dedicated parsers to interpret the incoming data and split it into distinct messages.

Conventional systems for receiving messages over a TCP stream require the use of a dedicated parser designed to process the incoming TCP stream and extract messages based on predefined criteria or specific markers. The parser is required to identify message boundaries and reconstruct the original messages for further processing by the receiving application.

There are various parsing techniques employed to extract messages from a TCP stream, such as delimiter-based parsing, length-prefixed parsing, and pattern-based parsing. The choice of parsing technique depends on the structure and characteristics of the messages being transmitted and the specific requirements of the receiving application.

The use of dedicated parsers for processing TCP streams introduces additional computational overhead, as the parsing process requires CPU cycles to execute. The complexity of the parsing technique directly impacts the number of CPU cycles required. For example, delimiter-based parsing may be less computationally intensive than pattern-based parsing, which often involves regular expression matching or more sophisticated algorithms.

Furthermore, the efficiency of the parsing process can be affected by the programming language used, the quality of the parser implementation, and the optimization techniques applied. As a result, the overall performance of the receiving application may be impacted by the additional CPU cycles consumed during the parsing process.

The conventional use of dedicated parsers for processing TCP streams introduces end-to-end latency. The parsing process adds an extra step in the data transmission pipeline, which can increase the time it takes for a message to be transmitted from the sender to the receiver and subsequently processed.

Also, the application protocol must specify a way to distinguish between messages in a stream of bits. In some cases, the implementation of the parser can be highly inefficient, e.g., implementing an HTTP analyzer using a GPU.

Utilizing dedicated parsers to process TCP streams and split them into distinct messages introduces additional computational overhead and end-to-end latency. These issues are resolved using the systems and methods described herein.

As described herein, a system or method of transmitting message-based data over packets may be implemented in a variety of ways. The method may be performed by, for example, a network node programmed to transmit message-based data over packets.

This new option removes the need for a parser in the receive side and removes the need from the application protocol to specify how to distinguish between a stream of messages.

Implementation of the disclosed systems and methods involve changes at the sending side and the receiving side. Using conventional TCP, the sending side takes all of its stream to the TCP layer and sends the stream over the wire, and the receiving side receives the stream and splits it into messages.

Using a protocol as described herein, an advantage is that the sender is building the stream. Because the sender is building the stream, sending the messages in the form of packets requires little to no overhead. On the receiver side, the receiving device can see that the packets contain message-based data based on options in the received packets and can quickly and efficiently parse the received data as messages.

Using a system as described herein, a firewall will not be required to parse in HTTP, it will just know that if the last packet had an end of message identifier, the next packet will be a start of a next HTTP message. Parsing is simpler as the information needed by the firewall will be in a constant location in the first packet for each message.

Also, from a data analytics side, if you want the GPU to process a stream in messages, a simple algorithm is needed, and the GPU is not required to parse the HTTP request, it just has to look for a flag/a single bit in the TCP packet to be able to identify each message which multiple TCP packets form.

By introducing a new option to the TCP, the TCP can be extended to allow for the transmission of message-based data.

In an option kind field, a number may be used to indicate the TCP connection (or packet) is message based. The number in the option kind field may be in a TCP handshake packet, signifying each of the following TCP packets are message-based, or may be in each TCP packet carrying message-based data, signifying only that the particular TCP packet is message-based. The number in the option kind field number may be a single byte and may be known at least by the receiver and by the device forming the messages into packets. For example, the number may be a constant number set by an authority service or may be a secret number known only by the parties sending and receiving the data.

The option of the data may also comprise an option length indicator, a number stating the total length of the option. The option of the data may also comprise, as described in greater detail below, an end-of-message flag and a message ID.

As illustrated in FIG. 1, two or more nodes 103a, 103b, may be in communication via a network 106. Each node 103 may be capable of transmitting and/or receiving data. Data sent over network 106 may be sent using the TCP.

Network 106 may be, for example, a local area network (LAN) connecting nodes 103a, 103b within an area, such as a home, office, or building. A LAN may use Ethernet or Wi-Fi technologies to provide communication between the nodes 103a, 103b. TCP communication over a LAN may be used, for example, to provide data transfer within the local network, facilitating applications such as file sharing, network printing, and media streaming.

In some implementations, the network 106 may be, for example, a wide area network (WAN) and may be used to connect nodes 103a, 103b over geographic distances. A WAN may comprise, for example, one or more of lines, satellite links, cellular networks. WANs may use various transmission technologies, such as leased lines, satellite links, or cellular networks, to provide long-distance communication. TCP communication over a WAN may be used, for example, to enable nodes 103a, 103b to communicate reliably across vast distances, facilitating applications such as remote access, virtual private networks (VPNs), and global file transfer.

In some implementations, network 106 may comprise the Internet, one or more mobile networks, such as 4G, 5G, LTE, virtual networks, such as a VPN, or some combination thereof.

Each of the nodes 103a, 103b may comprise network interfaces including, for example, a transceiver. Each node 103 may be capable of receiving and transmitting packets in conformance with applicable protocols such as TCP, although other protocols may be used. Each node 103 can receive and transmit packets to and from network 106.

A first node 103a may be a server and a second node 103b may be a client. For example, a first node 103a comprising a server may host resources or services, while a second node 103b comprising a client may request and receive the resources or services. Examples of client-server communication include web browsing, where a web server hosts web pages and a web browser acts as the client, or file transfer, where a file server hosts files and a client accesses or uploads files.

In some implementations, nodes 103a, 103b may act as clients and/or servers in a peer-to-peer (P2P) communication, where nodes 103a, 103b in the network 106 share resources and services with each other directly. In a P2P communication, the nodes 103a, 103b may communicate via TCP to exchange data, such as files, media content, or processing power.

In some implementations, one or more nodes 103a, 103b may be switches, proxies, gateways, load balancers, etc. Such nodes 103a, 103b may serve as intermediaries between clients and/or servers, relaying or modifying the communication between the clients and/or servers.

In some implementations, one or more nodes 103a, 103b may be IoT devices, such as sensors, actuators, and/or embedded systems, connected to the networks 106. Such IoT devices may act as clients, servers, or both, depending on implementations and the specific IoT applications. For example, a first node 103a may be a smart thermostat acting as a client, sending temperature readings to a second node 103b which may be a central server for analysis, and also acting as a server, receiving control commands from a third node 103 which may be, for example, a smartphone executing an app.

Figure 2:
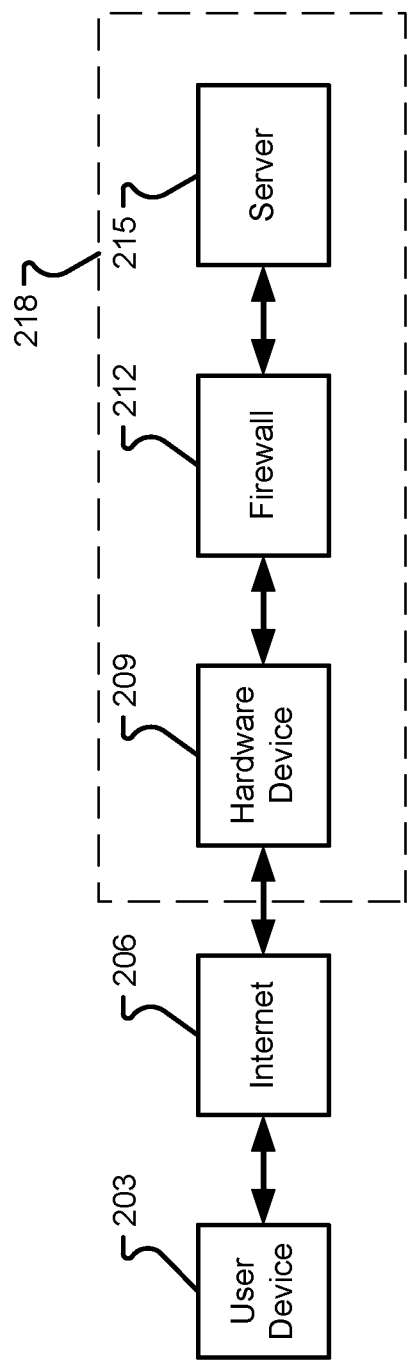
FIG. 2 is a block diagram of a networking environment in accordance with one or more of the embodiments described herein.

FIG. 2 is an illustration of a user device 203 communicating with a server 215 in accordance with one or more of the implementations described herein. In the example illustrated in FIG. 2, the user device 203 may be enabled to communicate with the server 215 using message-based TCP packets without requiring the user device 203 to be aware of the message-based TCP process. By implementing a hardware device 209 in the communication path, a data stream sent from the user device 203 to the server 215 may be intercepted, parsed, and processed into message-based packets, before being forwarded towards the server 215, as described in greater detail below.

The user device 203 may communicate with the server 215 using TCP. The data may travel from the user device 203, passing through the Internet 206, a hardware device 209, described in greater detail below, and a firewall 212, before ultimately reaching the server 215.

Before the data is exchanged between the user device 203 and the server 215, a TCP connection is established. The TCP connection may be established through a three-way handshake. The user device 203, acting as a client, may request the connection by sending a synchronize (SYN) packet to the server 215. The server 215 may acknowledge the request by sending back a synchronize-acknowledge packet. Finally, the client may send an acknowledge packet to the server, completing the handshake and establishing the TCP connection.

Once the TCP connection is established, the user device 203 and the server 215 can exchange data using TCP. The user device 203 sends TCP data packets which may traverse through various routers and gateways in the Internet 206 to reach a network 218 associated with the server 215.

Before the TCP packets reach the server 215, the packets 209 may first pass through a hardware device 209. The hardware device 209 may be programmed to receive a stream of data, parse the stream to identify messages, and repackage the messages into message-based TCP packets as described in greater detail below.

In the implementation illustrated in FIG. 2, the hardware device 209 passes the message-based TCP packets to a firewall 212. The firewall 212 may be designed to monitor and control incoming and outgoing network traffic based on predefined security rules. The firewall 212 may inspect the packets to determine whether the packets comply with established security policies.

If the data packets meet the security criteria, the firewall 212 may allow the packets to pass through the network 218 to the server 215. If the packets are deemed malicious or violate the security policies, the firewall 212 may block or drop the packets, preventing them from reaching the server 215.

After passing through the firewall 212, the data packets may reach the server 215, where the packets may be processed by a network interface of the server 215. The server 215 may determine, based on option data added to the packets by the hardware device 209, that the packets are message-based. In response to determining the packets are message-based, the server 215 may reassemble the messages based on the order the packets were received, message IDs stored in each packet, and/or any end-of-message IDs stored in packets. This process is described in greater detail below.

Response data packets from the server 215 to the user device 203 may follow a similar path back to the user device 203, traversing through the server's network 218, passing through the firewall 212, and reaching the hardware device 209. The hardware device 209 may, in some implementations, remove any message-based packet options, and output the data as a stream. The data stream may be transmitted across the Internet 206 via switches and gateways. Finally, the data packets may reach the user device 203.

Methods described herein may be performed by a hardware device 209. The hardware device 209 may be, for example, one of a data processing unit (DPU), a network interface card (NIC), and a dedicated hardware device.

Figure 3:
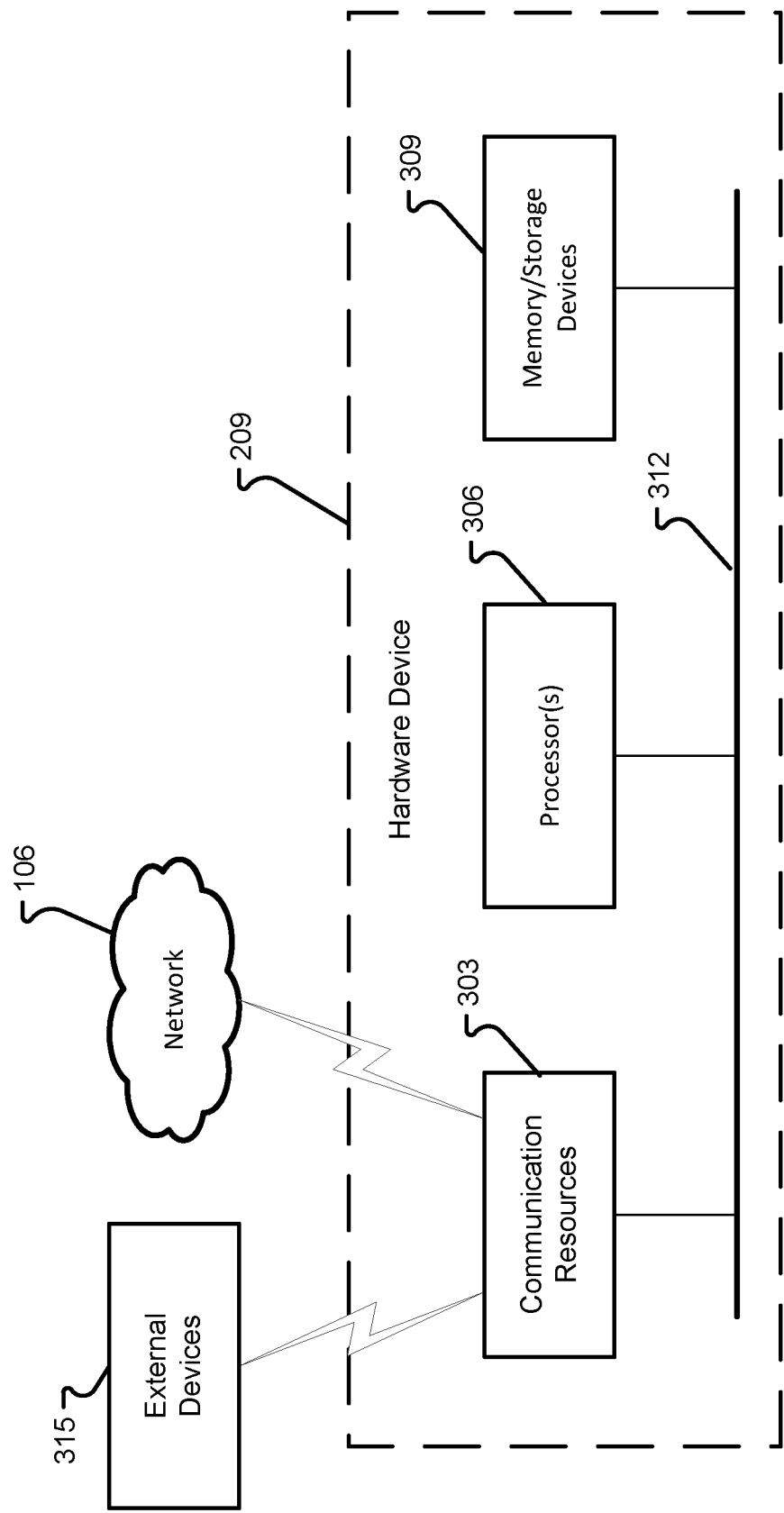
FIG. 3 is a block diagram of a hardware device in communication with external devices and a network in accordance with one or more of the embodiments described herein.

FIG. 3 is a block diagram illustrating components of a hardware device 209 which, according to some example implementations, may be capable of reading instructions from a machine-readable or computer-readable medium (e.g., a non-transitory machine-readable storage medium) and perform any one or more of the methods discussed herein. The hardware device 209 described herein includes one or more processors (or processor cores) 306, one or more memory and/or storage devices 309, and one or more communication resources 303. Each of the communication resource(s) 303, processor(s) 306, and memory and/or storage device(s) 309 may be communicatively coupled via a bus 312.

Processors 306 of the device 209 may include, for example, a CPU, a reduced instruction set computing (RISC) processor, a complex instruction set computing (CISC) processor, a GPU, a digital signal processor (DSP) such as a baseband processor, an application-specific integrated circuit (ASIC), a field-programmable gate array (FPGA), a radio-frequency integrated circuit (RFIC), another processor (including those discussed herein), or any suitable combination thereof.

The memory and/or storage devices 309 may include, for example, main memory, disk storage, or any suitable combination thereof. The memory and/or storage devices 309 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 303 may include, for example, interconnection or network interface components or other suitable devices to communicate with one or more external devices 315 or one or more databases via a network 106. For example, the communication resources 303 may include wired communication components (e.g., for coupling via USB), cellular communication components, near-field communication (NFC) components, Bluetooth™ (or Bluetooth™ Low Energy) components, Wi-Fi™ components, and other communication components.

The memory and/or storage devices 309 of the hardware device 209 may store instructions such as software, a program, an application, or other executable code for causing at least any of the processors 306 to perform any one or more of the methods discussed herein. The instructions may in some implementations reside, completely or partially, within at least one of the processors 306 (e.g., within the processor's cache memory), the memory/storage devices 309, or any suitable combination thereof. Furthermore, any portion of the instructions may be transferred to the hardware device 209 from any combination of the external devices 315 or from the network 106. Accordingly, the memory of processors 306, the memory and/or storage devices 309, the external devices 315, and databases accessible via the network 106 are examples of computer-readable and machine-readable media.

Figure 9:
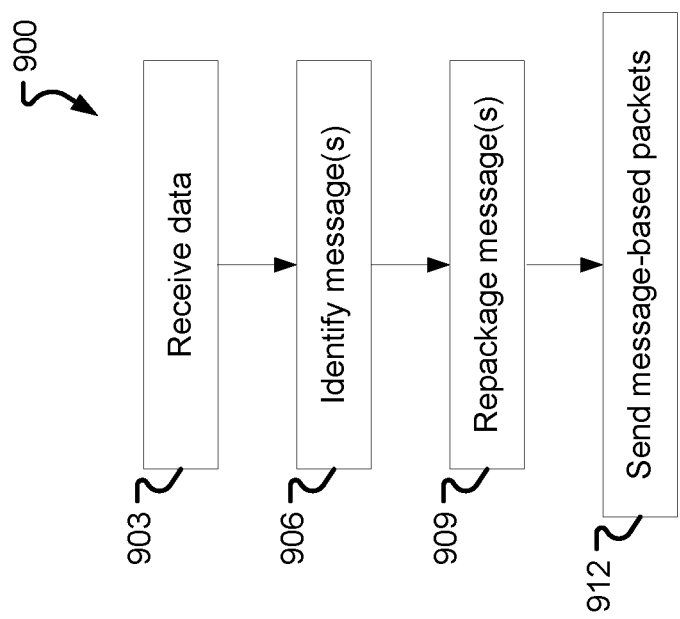
FIG. 9 is a flowchart of a method in accordance with one or more of the embodiments described herein.

In some embodiments, the electronic device(s), network(s), system(s), chip(s) or component(s), or portions or implementations thereof, of FIGS. 1-3, or some other figure herein, may be configured to perform one or more processes, techniques, or methods as described herein, or portions thereof. Such processes may be as depicted in FIGS. 7-9 and as described below.

Figure 4:
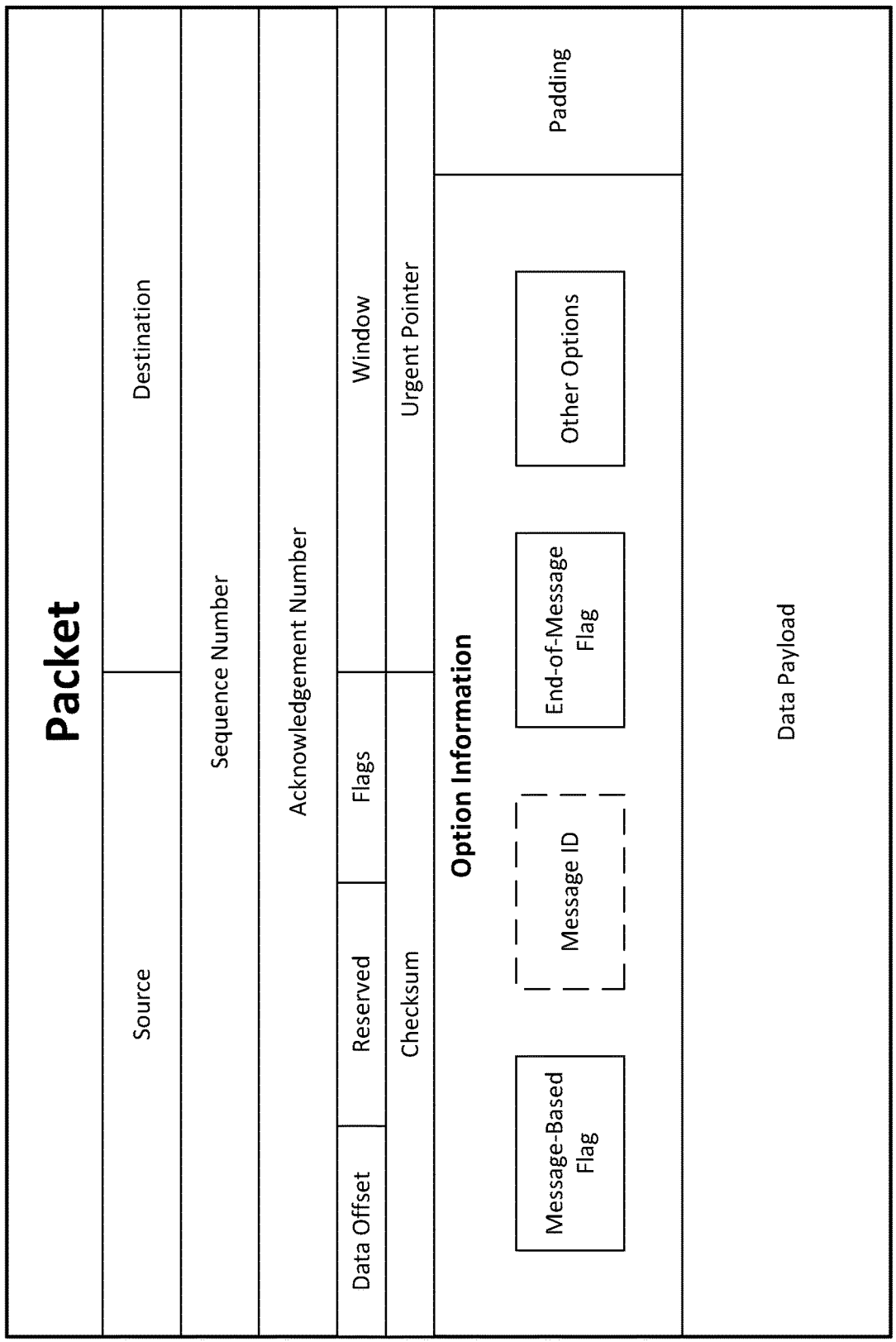
FIG. 4 is a block diagram of a packet in accordance with one or more of the embodiments described herein.

A packet, such as a TCP packet, which may also be known as a TCP segment, is a basic unit of data transmitted between nodes 103a, 103b, in a data connection such as a TCP connection. A packet may consist of two main components: a header and a data payload. FIG. 4 illustrates components of a packet in accordance with one or more of the implementations described herein. It should be appreciated that in some embodiments, a packet may comprise greater or fewer elements than those illustrated in FIG. 4.

A header of a packet may contain information required for the proper functioning of the protocol. For a TCP packet, the header may have a minimum size of 20 bytes and can be up to 60 bytes long, depending on the number and size of optional fields.

The header of the packet may include fields including, but not limited to, an indication of a source port, an indication of a destination, a sequence number, an acknowledgement number, data offset information, reserved bits, one or more flags, a window size, a checksum value, an urgent pointer, option information, and optionally padding.

The option information field may be of a variable length and may contain optional information, such as maximum segment size, window scaling, or selective acknowledgments.

As described herein, an option information field of a packet may comprise a message-based indicator, a message ID, and an end-of-message flag in addition to other options.

The message-based indicator may be a single bit, such as one or zero, indicating whether the packet should be treated as a message-based packet. For example, a one in the message-based flag field option may indicate the packet is message-based and should be treated as such.

The message ID option field may be a number indicating a message with which the packet is associated. For example, all packets associated with a first message in a data stream may include a zero in the message ID option field, and all packets associated with a second message in the data stream may include a one in the message ID option field.

The end-of-message flag may be a single bit, such as one or zero, indicating whether the packet contains a last portion of a particular message. For example, a one in the end-of-message flag may indicate the packet contains the last portion of a message of a data stream and that the next packet to be received may contain the first portion of a next message of the data stream.

The data payload of the packet is the actual data being transmitted between the sender and the receiver. The payload may follow the header and may vary in size, depending on the maximum segment size and the amount of data being transmitted.

A TCP data stream is typically split into a number of packets. The size of each packet may be dependent upon a number of factors. For example, TCP includes a maximum segment size (MSS) option which affects the maximum size of each packet. Packet size may also be limited by the maximum transmit unit (MTU). An MTU may be, for example, 1-2 kB. Because a webpage may range from a few bytes to multiple megabytes, sending an HTTP message including a webpage over TCP may require splitting the HTTP message into a plurality of TCP packets. The TCP packets to HTTP messages may or may not be a one-to-one relationship. For example, in conventional systems for sending messages over packets, each packet may contain more or less than one HTTP message.

Some applications and use cases do not handle the conventional transmission of HTTP messages over TCP well. For example, when performing data analytics to discover anomalies and/or attacks, or when performing analytics to improve infrastructure (such as GPUs or DPUs), the processing cannot be performed well enough. Such systems prefer to work on a single message at a time and parsing the stream into messages is inefficient.

As another example, to perform security processes against a specific measurement, example, HTTP, type: GET for a webpage may not be allowed. A firewall may be used to decide whether to allow or block traffic. The firewall may be required to parse the TCP stream to identify the HTTP messages.

Figure 5:
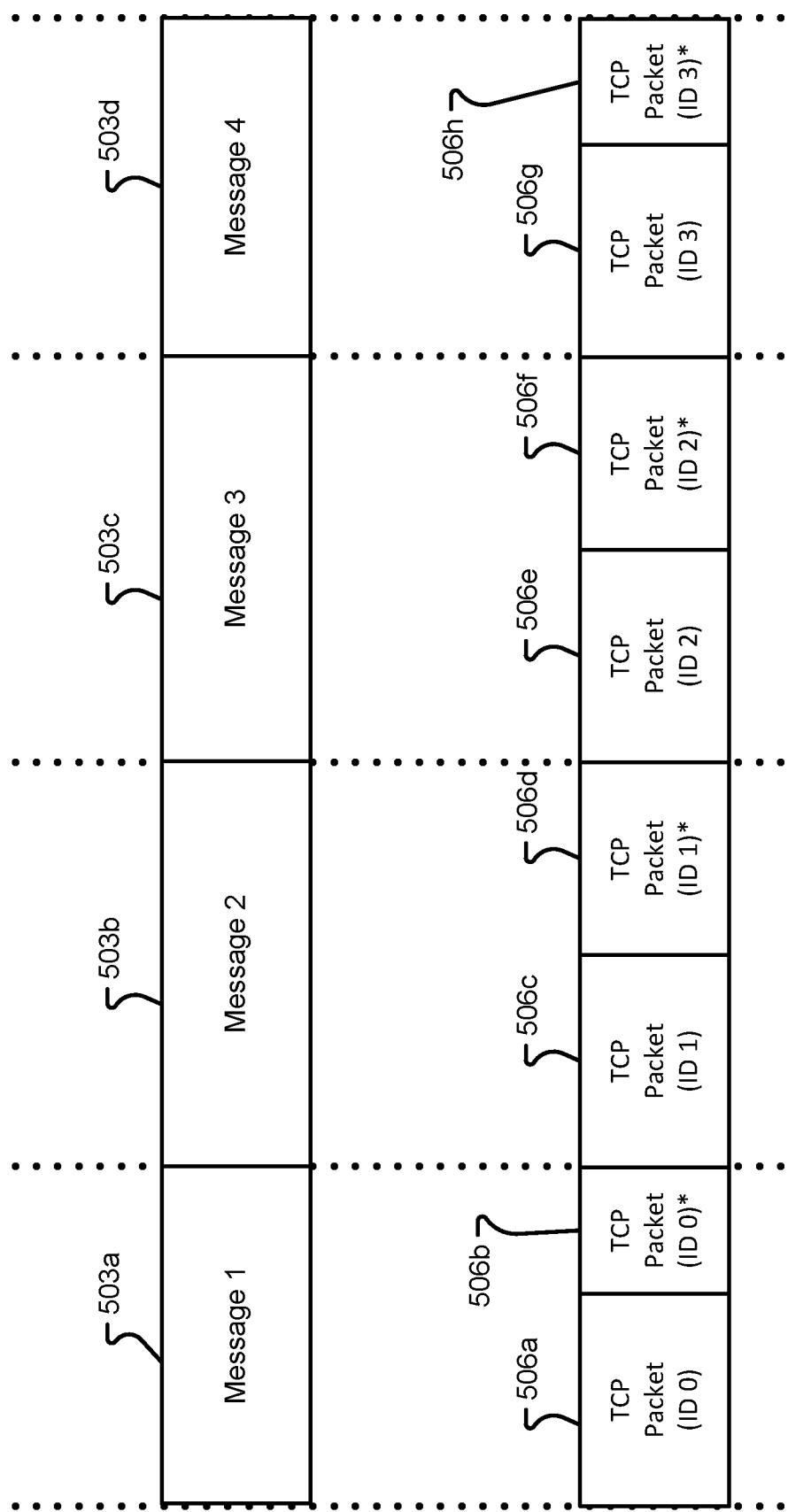
FIG. 5 is an illustration of conversion of messages to packets in accordance with one or more of the embodiments described herein.

FIG. 5 illustrates an implementation in which a message-based data stream including four messages 503a-503d has been used to generate a TCP data stream of message-based TCP packets 506a-h. As should be appreciated, a first message 503a is split into two TCP packets 506a, 506b, a second message 503b is split into two TCP packets 506c, 506d, a third message 503c is split into two TCP packets 506e, 506f, and a fourth message 503d is split into two TCP packets 506g, 506h.

Each TCP packet 506a-h includes a message ID. For example, TCP packets 506a, 506b identify message 1 503a by a message ID of 0, TCP packets 506c, 506d identify message 2 503b by a message ID of 1, TCP packets 506e, 506f identify message 3 503c by a message ID of 2, and TCP packets 506g, 506h identify message 4 503d by a message ID of 3.

The last packet associated with each message includes an end-of-message bit, illustrated in FIG. 5 as an asterisk. For example, TCP packet 506b includes an end-of-message bit indicating the packet 506b is a last packet of message 1 503a, TCP packet 506d includes an end-of-message bit indicating the packet 506d is a last packet of message 2 503b, TCP packet 506f includes an end-of-message bit indicating the packet 506f is a last packet of message 3 503c, and TCP packet 506h includes an end-of-message bit indicating the packet 506h is a last packet of message 4 503d.

Figure 6:
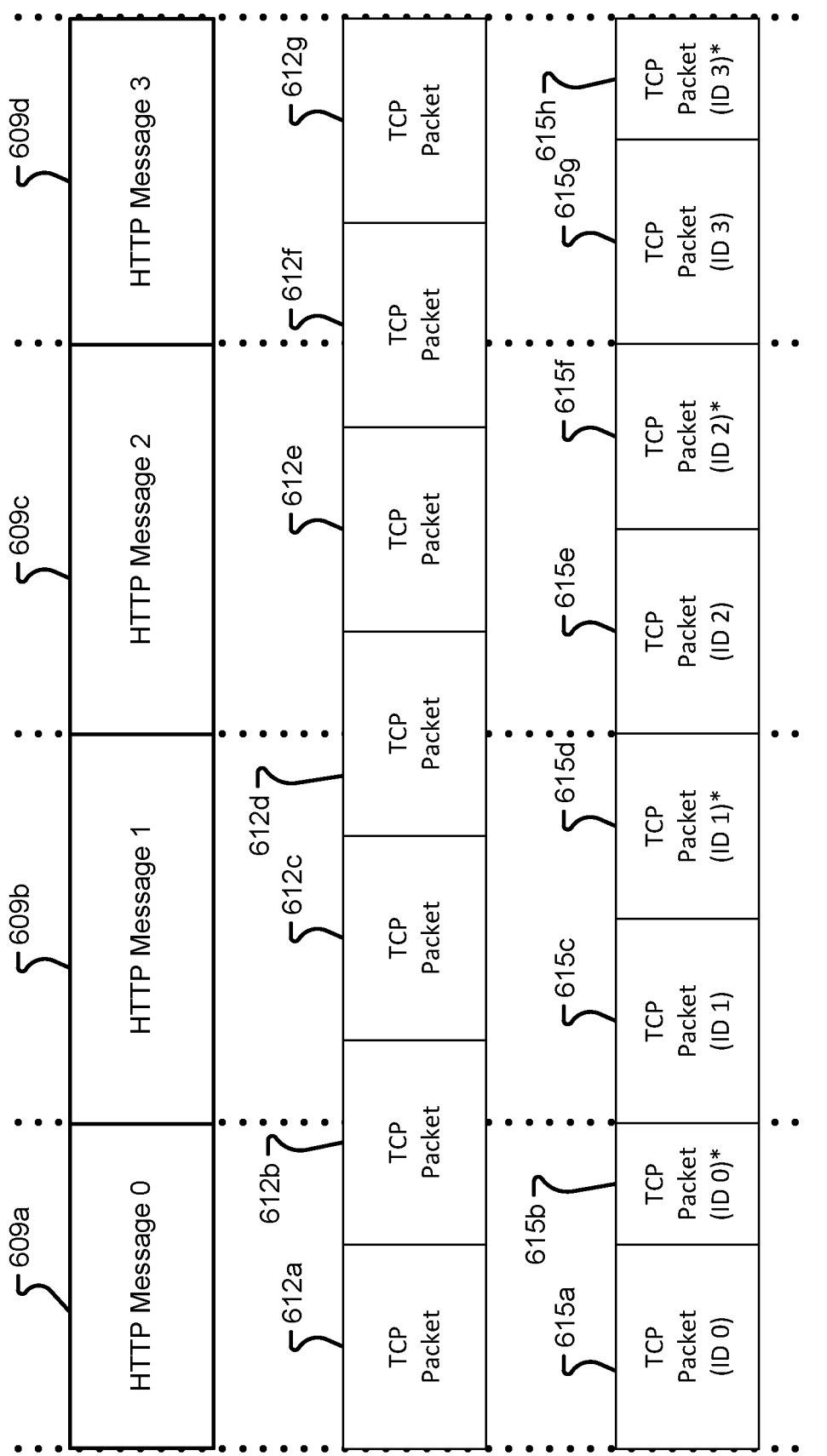
FIG. 6 is an illustration of conversion of messages to packets and to message-based packet in accordance with one or more of the embodiments described herein.

FIG. 6 illustrates the conversion of TCP packets 612a-g which contain data associated with four messages 609a-d into message-based packets 615a-h. Such a conversion process may be performed by a hardware device 209 as illustrated in FIG. 2 using a method 900 as described below in relation to FIG. 9.

The hardware device 209 may receive the TCP packets 612a-g in sequence, parse the TCP packets 612a-g to identify HTTP messages 0-3 609a-d, and generate message-based TCP packets 615a-h. Unlike the TCP packets 612a-g received by the hardware device 209, the message-based TCP packets 615a-h generated by the hardware device 209 may contain data relating to only one message, may contain a message ID, and the last message-based TCP packet associated with each message 609a-d may include an end-of-message bit, illustrated in FIG. 6 by an asterisk.

While FIGS. 5 and 6 illustrate each message being sent over two message-based TCP packets, it should be appreciated each message may be sent using any number of message-based TCP packets. Some messages may be sent using a single message-based TCP packet while other messages may be sent using two or more message-based TCP packets. The illustrations of FIGS. 5 and 6 should not be considered as limiting in any such way.

The systems and methods described herein resolve the above-discussed issues with carrying message-based data over a stream by extending the TCP protocol to be effectively message-based.

In some embodiments, a method 700 as illustrated by the flowchart of FIG. 7 may enable a node 103 to send message-based packets over a network 106 to another node 103. The method 700 may begin by a user or a sending node 103 at the sending side determining data should be sent to a receiving node 103. The sending node 103 may be, for example, a hardware device 209 such as illustrated in FIG. 3. Transmitting the packets may be performed by one or more transport layer circuits of the sending node 103. The sending and/or receiving nodes 103 may be, for example, a DPU, a NIC, a server, or a dedicated hardware device.

Upon determining data should be sent to the receiving node 103, the sending node 103 may determine the data to be sent to the receiving device is message-based. Determining the data is message-based may comprise, for example, determining the data includes HTTP messages.

At 703, a TCP connection may be initiated by the sending node 103 generating and sending a TCP handshake packet to the receiving device to initiate the TCP connection. The TCP handshake packet may be one of a three-way handshake between the sending node 103 and the receiving node 103.

During the handshake process, the send and receive nodes 103 may agree to connection parameters, including whether the stream will be message-based. For example, In some embodiments, the TCP handshake packet may comprise an option indicating the packets to be sent via the TCP connection are message-based. If the options in the TCP handshake packet indicate the connection is message-based, then the receiver can look at each packet to determine whether the packet is a first packet for a next message.

In some implementations, the TCP handshake packet may not be required to indicate the packets will be message-based. Instead, the receiving node 103 may be enabled to determine separately for each packet whether the respective packet is message-based based on options within a head of each packet as described herein.

At 706, the method 700 may comprise the sending node 103 identifying a first message from within the message-based data to be sent to the receiving node 103.

It should be appreciated that each message may be identified in data received by the sending node 103 from an external device such as via a communication network. For example, the hardware device 209 of FIG. 3 may be the sending node 103 and may receive messages from an external device 315 via one or more communication resources 303.

At 709, the sending node 103 may generate one or more packets including data from the first message. In some implementations, the sending node 103 may employ a transport layer or a TCP layer to generate one or more packets from the message. The packets generated may be TCP packets. The message may be an HTTP message. The number of packets generated may be determined based on a length of the message and a maximum length of the packets. For example, the sending node 103 may generate a minimum number of packets required to contain all the data from the message.

Generating the packets may comprise dividing the message into smaller segments and encapsulating the segments into packets. Each packet may contain a header with information such as the source and destination port numbers, sequence and acknowledgment numbers, and various flags that aid in establishing, maintaining, and terminating a connection. Additionally, the sending node 103 may include in the header of each packet a message-based flag indicating the packet is a message-based packet and/or a message ID indicating a message number of a message associated with each packet. Furthermore, for a last packet associated with a given message, the sending node 103 may include in the header of each packet an end-of-message flag or bit indicating the packet is a last packet associated with the message, or that the packet contains a final portion of the message.

As an example, a first portion of a first message may comprise at least a portion of a header of the first message, and a final portion of the first message may comprise at least a portion of a body of the first message.

The message ID may start at zero, or another number, and increase between messages by one. The end-of-message bit may be set only on a packet which is the last part of a message (meaning that after a packet with an end-of-message set, the message ID is expected to be increased by one.

Each packet containing data relating to the first message in the stream being sent to the receiver may include a message ID of zero. Each packet containing data relating to the second message in the stream being sent to the receiver may include a message ID of one. Each packet containing data relating to the Nth message in the stream being sent to the receiver may include a message ID of N-1.

The packets may be generated in such a way that, upon reception, a TCP or transport layer of the destination node 103 may reassemble the packets and reconstruct the original message, ensuring its integrity and reliability.

At 712, the sending node 103 may send the message-based packets to the destination node 103. After generating the packets, the packets may be handed over by the transport or TCP layer to a lower-level Internet Protocol (IP) layer, which handles routing and forwarding them to the destination device. In some implementations, the packets may be intercepted by a firewall prior to reaching the destination node 103.

The method may continue by identifying a second message, and repeating the process of packaging the second message into one or more packets and transmitting the packets associated with the second message.

On the receiving side, a transport or TCP protocol of the receiving node 103 may accumulate the received packets and reform the messages based on a message ID to the receiving application the messages the packets compose using a method 800 such as illustrated in FIG. 8. Using the method, a transport or TCP stack of the receiving node 103 may transfer all packets with the same message ID until an end-of-message bit is set in a packet, as a single message.

In TCP, for example, there are many concepts for accelerating the handling of packets. TCP is limited by maximum packet size which is based on physical limitations of the wire. In software, there are no such limitations, the bigger the packet the better the software can perform. Systems of aggregation may be used to aggregate packets into larger packets for being handled by the software. Using a system as described herein, a system may be used to aggregate only messages associated with a particular message. These larger packets, created by aggregating smaller packets relating to a particular message, which contain single whole messages may easily be handled by software.

The method 800 may begin at 803 with a receiving node 103 receiving packets. The packets may be received by the receiving node 103 via a network connection such as via a network 106 illustrated in FIG. 1, or from the Internet 206 as illustrated in FIG. 2, or otherwise from a data source.

At 806, the receiving node 103 may monitor incoming packets until a packet with a set end-of-message bit or flag is received. Once the packet with a set end-of-message bit or flag is received, the receiving node 103 may determine all of the packets associated with the message indicated by the message ID of the packet with the set end-of-message bit or flag have been received.

At 809, upon receiving a message-based packet with a set end-of-message bit, the receiving node 103 may aggregate each packet with a common message ID into a larger packet or message.

In some implementations, aggregating the packets with a common message ID may comprise regenerating the message by removing packet data such as options and other data added by the sender node 103 when the packets were generated. In this way, the receiver node 103 may be capable of recreating the original messages.

By consolidating smaller packets into a larger one, the receiver node 103 may be enabled to reduce the number of packets that need to be processed by the operating system of the receiver node 103 and minimize overhead associated with message packet processing. As a result, the method 800 can substantially decrease the CPU utilization, allowing the system to handle higher throughput and perform other tasks more efficiently.

In some embodiments, the handling of message-based packets may operate at lower levels of the networking stack, such as at the data link, network, TCP, or transport layers, and may be transparent to higher-level protocols such as application layers.

At 812, after aggregating the multiple incoming packets which share a common message ID into a larger single packet, the larger single packet may be passed up to a higher-level protocol stack. For example, the packet may be delivered to an application or process to which the message was sent.

In some implementations, the benefits of message-based packets may be achieved even when a sending node 103 is not programmed to send message-based packets. For example, a user device 203 as illustrated in FIG. 2 may transmit a stream of conventional TCP packets including HTTP messages over the Internet 206 towards a server 215. Conventionally, a TCP stream including a series of HTTP messages will divide the messages into multiple TCP packets without regard to the start and stop of the HTTP messages, a single TCP packet may contain data of a last portion of a first HTTP message and data of first portion of a second HTTP message.

The method of FIG. 9 enables message-based packets to be received by a server or other receiving node 103 even if one of the peers, e.g., a sending node 103, is unaware of the extension.

A hardware device 209 such as one within a local network 218 with which the server 215 is in communication, may intercept the stream of TCP packets sent by the sending node 103. Such TCP packets may be as illustrated by TCP packets 612a-g of FIG. 6, in which a single packet, such as TCP packet 612b, includes portions of two or more HTTP messages, such as HTTP messages 0 and 1 609a, 609b.

In that case, the receive side must preprocess the TCP packets before delivering them to the TCP stack. The receive pre-process should parse the TCP payload according to the upper layer protocol message and then add the "message-based" option accordingly before forwarding it to the TCP stack.

The hardware device 209 may be programmed to parse the TCP packets, identify messages contained within, and to output message-based packets, such as TCP packets 615a-h as illustrated in FIG. 6, in which each packet is associated with only one message and contains a message ID. A last packet for each message may contain an end-of-message bit or flag as described herein. The hardware device, being built to perform this task, is capable of performing this task in a fast manner, reducing the latency which affects firewalls.

At 903, the hardware device 209 may receive the data from the sending node 103. As described above, the received data may comprise a conventional stream of TCP packets containing one or more messages. The messages may be split across the TCP packets without regard to the start and stop of each message.

At 906, the hardware device 209 may identify the messages contained in the packets of the data. For example, the hardware device 209 may parse the incoming stream of packets to identify the start of each message. The start of each message may be identified by, for example, identifying a header of a message in the payload data of a packet.

At 909, for each message, the hardware device may repackage the message into one or more message-based packets as described herein. The hardware device may include a message ID number in each packet indicating the message to which the contents of the packet relate. A last packet for each message may include an end-of-message bit.

At 912, the hardware device 209 may send the message-based packets. After repackaging the messages into message-based packets, the hardware device 209 may forward the repackaged data to the upper layers of software, or to a GPU, a firewall 212, a server 215, a data analytics entity, or elsewhere.

A firewall 212 may determine whether to block or let pass the received HTTP data. When looking at a stream, typically, the firewall 212 must search for the header of the message. In the raw HTTP data stream from the user device, the firewall must parse the data looking for headers which can be at any point in the received HTTP data. By using a hardware device 209 to convert the received HTTP data to message-based, the firewall 212 can instantly know where to look in the data without parsing the data looking for headers.

With a receive-side-only message-based packets protocol as described above in relation to FIG. 9, network devices are enabled to achieve the features of the message-based commmunication without the additional overhead of the message-based option in the write and without the support of the sending node 103.

Each message may be sent over any number of packets. An example of six messages used to generate fifteen packets is illustrated in Table 1, below.

TABLE 1

| Message Number | Packet Number | Message-based | Message ID | End-of-message |
|---|---|---|---|---|
| 1 | 1 | 1 | 0 | 0 |
| 1 | 2 | 1 | 0 | 0 |
| 1 | 3 | 1 | 0 | 0 |
| 1 | 4 | 1 | 0 | 1 |
| 2 | 5 | 1 | 1 | 0 |
| 2 | 6 | 1 | 1 | 0 |
| 2 | 7 | 1 | 1 | 1 |
| 3 | 8 | 1 | 2 | 0 |
| 3 | 9 | 1 | 2 | 1 |
| 4 | 10 | 1 | 3 | 0 |
| 4 | 11 | 1 | 3 | 0 |
| 4 | 12 | 1 | 3 | 1 |

TABLE 1-continued

| Message Number | Packet Number | Message-based | Message ID | End-of-message |
|---|---|---|---|---|
| 5 | 13 | 1 | 4 | 1 |
| 6 | 14 | 1 | 5 | 0 |
| 6 | 15 | 1 | 5 | 1 |

Column 1 of Table 1 shows a message number indicating an order which each message was received. Messages 1-6 were received sequentially.

Column 2 of Table 1 shows a packet number indicating packets generated based on the received messages. Message 1 was used to generate packets 1-4, message 2 was used to generate packets 5-7, message 3 was used to generate packets 8 and 9, message 4 was used to generate packets 10-12, message 5 was used to generate packet 13, and message 6 was used to generate packets 14 and 15.

Column 3 of Table 1 shows the contents of the message-based indicator option for each packet. Because each of packets 1-15 are message-based, a one is shown for each packet.

Column 4 of Table 1 shows the message ID for each packet. Packets 1-4 are given a message ID of zero as packets 1-4 contain the data of the first message. Packets 5-7 are given a message ID of one as packets 5-7 contain the data of the second message. Packets 8 and 9 are given a message ID of two as packets 8 and 9 contain the data of the third message. Packets 10-12 are given a message ID of three as packets 10-12 contain the data of the fourth message. Packet 13 is given a message ID of four as packet 13 contains the data of the fifth message. Packets 14 and 15 are given a message ID of five as packets 14 and 15 contain the data of the sixth message.

Column 5 of Table 1 shows the end-of-message bit contents for each packet. Packets 4, 7, 9, 12, 13, and 15 include a one as an end-of-message bit indicating packets 4, 7, 9, 12, 13, and 15 include the final portion of a respective message. The other packets include a zero as an end-of-message bit indicating the packets do not include the final portion of a respective message.

The present disclosure encompasses embodiments of the methods 700, 800, and 900 that comprise more or fewer steps than those described above, and/or one or more steps that are different than the steps described above.

The present disclosure encompasses methods with fewer than all of the steps identified in FIGS. 7-9 (and the corresponding description of the method), as well as methods that include additional steps beyond those identified in FIGS. 7-9 (and the corresponding description of the method). The present disclosure also encompasses methods that comprise one or more steps from one method described herein, and one or more steps from another method described herein. Any correlation described herein may be or comprise a registration or any other correlation.

Embodiments of the present disclosure include a method of transmitting message-based data over packets, the method comprising: identifying a first message; transmitting a first portion of the first message in a first packet, the first packet comprising a bit indicating the first packet is message-based; and transmitting an end portion of the first message in a second packet, the second packet comprising a first bit indicating the second packet is message-based and a second bit indicating the second packet comprises the end portion of the first message.

Aspects of the above method include wherein each of the first packet and the second packet further comprise a first message ID.

Aspects of the above method include the method further comprising, after transmitting the first portion and before transmitting the end portion, transmitting a second portion of the first message in a third packet, the third packet comprising the first message ID.

Aspects of the above method include wherein the first message ID is stored in an option field of a header of each of the first and second packets.

Aspects of the above method include the method further comprising: identifying a second message; transmitting a first portion of the second message in a third packet, the third packet comprising a second message ID; and transmitting an end portion of the second message in a fourth packet, the fourth packet comprising the second message ID and a bit indicating the fourth packet comprises the end portion of the second message.

Aspects of the above method include the method further comprising, prior to identifying the first message, receiving a TCP handshake packet to initiate a TCP connection, the TCP handshake packet comprising an option indicating the TCP connection is message-based.

Aspects of the above method include wherein the first message is identified in data received from an external device via a communication network and wherein the method is performed by one of a DPU, NIC, and a dedicated hardware device.

Aspects of the above method include wherein the first packet is transmitted by the one of the DPU, the NIC, and the dedicated hardware device to a server.

Aspects of the above method include wherein the first message is an HTTP request message.

Aspects of the above method include wherein the first packet is transmitted to the server via a firewall.

Aspects of the above method include wherein the first portion of the first message comprises a at least a portion of a header of the first message, and wherein the final portion of first message comprises at least a portion of a body of the first message.

Aspects of the above method include wherein the first and second packets are TCP packets.

Embodiments include a system for transmitting message-based data over packets, the system comprising: one or more circuits to identify a first message; and one or more transport layer circuits to: transmit a first portion of the first message in a first packet, the first packet comprising a bit indicating the first packet is message-based; and transmit an end portion of the first message in a second packet, the second packet comprising a first bit indicating the second packet is message-based and a second bit indicating the second packet comprises the end portion of the first message.

Aspects of the above system include wherein each of the first packet and the second packet further comprise a first message ID.

Aspects of the above system include wherein the one or more transport layer circuits are further to, after transmitting the first portion and before transmitting the end portion, transmit a second portion of the first message in a third packet, the third packet comprising the first message ID.

Aspects of the above system include wherein the first message ID is stored in an option field of a header of each of the first and second packets.

Aspects of the above system include wherein the one or more circuits are further to identify a second message, and the one or more transport layer circuits are further to:

transmit a first portion of the second message in a third packet, the third packet comprising a second message ID; and transmit an end portion of the second message in a fourth packet, the fourth packet comprising the second message ID and a bit indicating the fourth packet comprises the end portion of the second message.

Aspects of the above system include wherein the one or more circuits are further to receive a TCP handshake packet to initiate a TCP connection, the TCP handshake packet comprising an option indicating the TCP connection is message-based.

Aspects of the above system include wherein the one or more transport layer circuits are provided in at least one of a DPU, a NIC, and a dedicated hardware device, wherein the first message is identified in data received by the at least one of the DPU, the NIC, and the dedicated hardware device.

Aspects of the above system include wherein the first packet is transmitted by the one of the DPU, the NIC, and the dedicated hardware device to a server.

Aspects of the above system include wherein the first packet is transmitted to the server via a firewall.

Aspects of the above system include wherein the first portion of the first message comprises a at least a portion of a header of the first message, and wherein the final portion of first message comprises at least a portion of a body of the first message.

Aspects of the above system include wherein the first message is a Hypertext Transfer Protocol (HTTP) request message.

Embodiments include a network node for transmitting message-based data over packets, the network node comprising: one or more circuits to identify a first message; and one or more circuits to transmit a first portion of the first message in a first packet, the first packet comprising a bit indicating the first packet is message-based; and one or more circuits to transmit an end portion of the first message in a second packet, the second packet comprising a first bit indicating the second packet is message-based and a second bit indicating the second packet comprises the end portion of the first message.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

What is claimed is:

1. A system for transmitting message-based data over packets, the system comprising:
    one or more transport layer circuits to:
        transmit a first portion of a first message in a first packet, the first packet comprising a bit having a value that indicates the first packet is either message-based or not message-based, wherein the first message is included in a stream of messages; and
        transmit an end portion of the first message in a second packet, the second packet comprising a first bit having a value that indicates the second packet is either message-based or not message-based and a second bit indicating the second packet is a last packet of the first message to enable a receiver to distinguish the first message from other messages in the stream of messages.

2. The system of claim 1, wherein the value of the bit in the first packet and the value of the first bit in the second packet is either '0' or '1', and wherein each of the first packet and the second packet further comprise a first message identifier (ID) having a value that depends on where the first message is positioned within the stream of messages.

3. The system of claim 2, wherein the one or more transport layer circuits are further to, after transmitting the first portion and before transmitting the end portion of the first message, transmit a second portion of the first message in a third packet, the third packet comprising the first message ID.

4. The system of claim 2, wherein the first message ID is stored in an option field of a header of each of the first and second packets.

5. The system of claim 2, wherein, after transmission of the first packet and the second packet, the one or more transport layer circuits are further to:
    transmit a first portion of a second message in a third packet, the third packet comprising a second message identifier (ID), the second message ID having a value that is incremented compared to a value of the first message ID; and
    transmit an end portion of the second message in a fourth packet, the fourth packet comprising the second message ID and a bit indicating the fourth packet comprises the end portion of the second message.

6. The system of claim 1, wherein the one or more transport layer circuits are further to receive a TCP handshake packet to initiate a TCP connection, the TCP handshake packet comprising an option to indicate that the TCP connection is either message-based or not message-based.

7. The system of claim 1, wherein the one or more transport layer circuits are provided in at least one of a data processing unit (DPU), a network interface card (NIC), and a dedicated hardware device.

8. The system of claim 7, wherein the first message is identified in data received by the at least one of the DPU, the NIC, and the dedicated hardware device.

9. The system of claim 7, wherein the first packet is transmitted by the one of the DPU, the NIC, and the dedicated hardware device to a server.

10. The system of claim 9, wherein the first packet is transmitted to the server via a firewall.

11. The system of claim 1, wherein the first portion of the first message comprises at least a portion of a header of the first message, and wherein the end portion of the first message comprises at least a portion of a body of the first message.

12. The system of claim 1, wherein the first message is a Hypertext Transfer Protocol (HTTP) request message, and wherein the first packet and the second packet are TCP packets.

13. A method of transmitting message-based data over packets, the method comprising:
    identifying a first message of a stream of messages;
    transmitting a first portion of the first message in a first packet, the first packet comprising a bit having a value that indicates the first packet is either message-based or not message-based; and
    transmitting an end portion of the first message in a second packet, the second packet comprising a first bit having a value that indicates the second packet is either message-based or not message-based and a second bit indicating the second packet is a last packet of the first message to enable a receiver to distinguish the first message from other messages in the stream of messages.

14. The method of claim 13, wherein each of the first packet and the second packet further comprise a first message identifier (ID).

15. The method of claim 14, further comprising, after transmitting the first portion and before transmitting the end portion, transmitting a second portion of the first message in a third packet, the third packet comprising the first message ID.

16. The method of claim 14, wherein the first message ID is stored in an option field of a header of each of the first and second packets.

17. The method of claim 14, further comprising:
identifying a second message;
transmitting a first portion of the second message in a third packet, the third packet comprising a second message identifier (ID); and
transmitting an end portion of the second message in a fourth packet, the fourth packet comprising the second message ID and a bit indicating the fourth packet comprises the end portion of the second message.

18. The method of claim 13, further comprising, prior to identifying the first message, receiving a TCP handshake packet to initiate a TCP connection, the TCP handshake packet comprising an option indicating the TCP connection is message-based.

19. The method of claim 13, wherein the first message is identified in data received from an external device via a communication network and wherein the method is performed by one of a data processing unit (DPU), a network interface card (NIC), and a dedicated hardware device.

20. A network node for transmitting message-based data over packets, the network node comprising:
one or more circuits to identify a first message of a stream of messages;
one or more circuits to transmit a first portion of the first message in a first packet, the first packet comprising a bit having a value that indicates the first packet is either message-based or not message-based; and
one or more circuits to transmit an end portion of the first message in a second packet, the second packet comprising a first bit having a value that indicates the second packet is either message-based or not message-based and a second bit indicating the second packet is a last packet of the first message to enable a receiver to distinguish the first message from other messages in the stream of messages.

* * * * *